United States Patent
Zhu

(10) Patent No.: US 9,258,734 B2
(45) Date of Patent: Feb. 9, 2016

(54) RESOURCE MANAGEMENT IN MULTIPLE RADIO ACCESS NETWORKS

(71) Applicant: Intel Corporation, Santa Clara, CA (US)

(72) Inventor: Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 14/122,961

(22) PCT Filed: Aug. 12, 2013

(86) PCT No.: PCT/US2013/054542
§ 371 (c)(1),
(2) Date: Nov. 27, 2013

(87) PCT Pub. No.: WO2015/023250
PCT Pub. Date: Feb. 19, 2015

(65) Prior Publication Data
US 2015/0043336 A1    Feb. 12, 2015

(51) Int. Cl.
| | |
|---|---|
| *H04W 24/00* | (2009.01) |
| *H04W 72/04* | (2009.01) |
| *H04L 12/28* | (2006.01) |
| *H04W 28/02* | (2009.01) |
| *H04W 28/08* | (2009.01) |

(Continued)

(52) U.S. Cl.
CPC ......... *H04W 28/0268* (2013.01); *H04L 47/125* (2013.01); *H04L 47/30* (2013.01); *H04W 28/08* (2013.01); *H04W 28/16* (2013.01)

(58) Field of Classification Search
CPC ..... H04W 24/00; H04W 84/12; H04W 80/04; H04W 72/04; H04L 12/28; H04L 47/10
See application file for complete search history.

(56) References Cited

U.S. PATENT DOCUMENTS

2004/0002330 A1*   1/2004   Chitrapu .................... 455/426.2
2009/0034426 A1*   2/2009   Luft et al. .................... 370/252

(Continued)

OTHER PUBLICATIONS

ETSI, Digital cellular telecommunications system (Phase 2+); Universal Mobile Telecommunications System (UMTS); LTE; Feasibility study on 3GPP system to Wireless Local Area Network (WLAN) interworking (3GPP TR 22.934 version 11.0.0 Release 11), Cedex, France ( Oct. 2012), 33 pages.

(Continued)

*Primary Examiner* — Andrew Lee
(74) *Attorney, Agent, or Firm* — Schwabe, Williamson & Wyatt, P.C.

(57) ABSTRACT

Embodiments of the present disclosure describe techniques and configurations for resource management associated with communications in multiple radio access networks. In one example, a method of resource management may include obtaining quality of experience (QoE) information from a network server running deep packet inspection or an application executing on a computing device and configured to provide content to the computing device for user access, and determining whether to adjust the content delivery via at least one of the two radio access networks, based at least in part on the quality experience information. The adjustment may include increasing or reducing the content delivery via one of the radio access networks. The content may be delivered to the computing device via at least two radio access networks substantially simultaneously. Other embodiments may be described and/or claimed.

18 Claims, 4 Drawing Sheets

(51) Int. Cl.
  *H04L 12/803* (2013.01)
  *H04L 12/835* (2013.01)
  *H04W 28/16* (2009.01)

(56) References Cited

U.S. PATENT DOCUMENTS

| | | | |
|---|---|---|---|
| 2009/0086651 A1* | 4/2009 | Luft et al. | 370/253 |
| 2010/0208607 A1 | 8/2010 | Chin et al. | |
| 2010/0248643 A1* | 9/2010 | Aaron et al. | 455/68 |
| 2011/0280153 A1* | 11/2011 | Li et al. | 370/254 |
| 2012/0110167 A1 | 5/2012 | Joch et al. | |
| 2013/0064098 A1 | 3/2013 | El-Saidny et al. | |
| 2013/0083783 A1 | 4/2013 | Gupta et al. | |
| 2013/0201847 A1 | 8/2013 | Chincholi et al. | |
| 2013/0262659 A1* | 10/2013 | Parthasarathy et al. | 709/224 |
| 2014/0126502 A1* | 5/2014 | Westberg et al. | 370/329 |
| 2014/0241174 A1* | 8/2014 | Harris et al. | 370/252 |
| 2015/0067184 A1* | 3/2015 | Parthasarathy | 709/231 |
| 2015/0113133 A1* | 4/2015 | Srinivas et al. | 709/224 |

OTHER PUBLICATIONS

ETSI, Digital cellular telecommunications system (Phase 2+); Universal Mobile Telecommunications System (UMTS); LTE; Architecture enhancements to facilitate communications with packet data networks and applications (3GPP TS 23.682 version 11.4.0 Release 11), Cedex, France (Jun. 2013), 31 pages.

International Search Report for PCT Application No. PCT/US2013/054542, dated May 16, 2014, 10 pages.

* cited by examiner

RESOURCE MANAGEMENT IN MULTIPLE RADIO ACCESS NETWORKS

CROSS REFERENCE TO RELATED APPLICATIONS

The present application is a national phase entry under 35 U.S.C. §371 of International Application No. PCT/US2013/054542, filed Aug. 12, 2013, entitled "RESOURCE MANAGEMENT IN MULTIPLE RADIO ACCESS NETWORKS", the entire disclosure of which is hereby incorporated by reference in its entirety.

FIELD

Embodiments of the present disclosure generally relate to the field of wireless communication systems, and more particularly, to techniques and configurations for managing resources in multiple radio access networks.

BACKGROUND

Interactions between wireless devices and wireless communication networks in which the devices operate may be conducted via different radio access networks. Today's mobile client wireless devices such as laptops, smartphones, ultrabooks, tablet computers and the like may be equipped with components (e.g., Wi-Fi and cellular radios) configured to provide the wireless device with access to different radio access networks (e.g., wireless local area networks such as Wi-Fi and cellular networks) substantially simultaneously. However, it may be challenging to integrate multiple radio access networks, e.g. Wi-Fi and cellular network in a cost-effective way, e.g., by maximizing the use of Wi-Fi versus a cellular network for wireless communications without sacrificing quality of user experience, particularly when using applications that involve data streaming.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
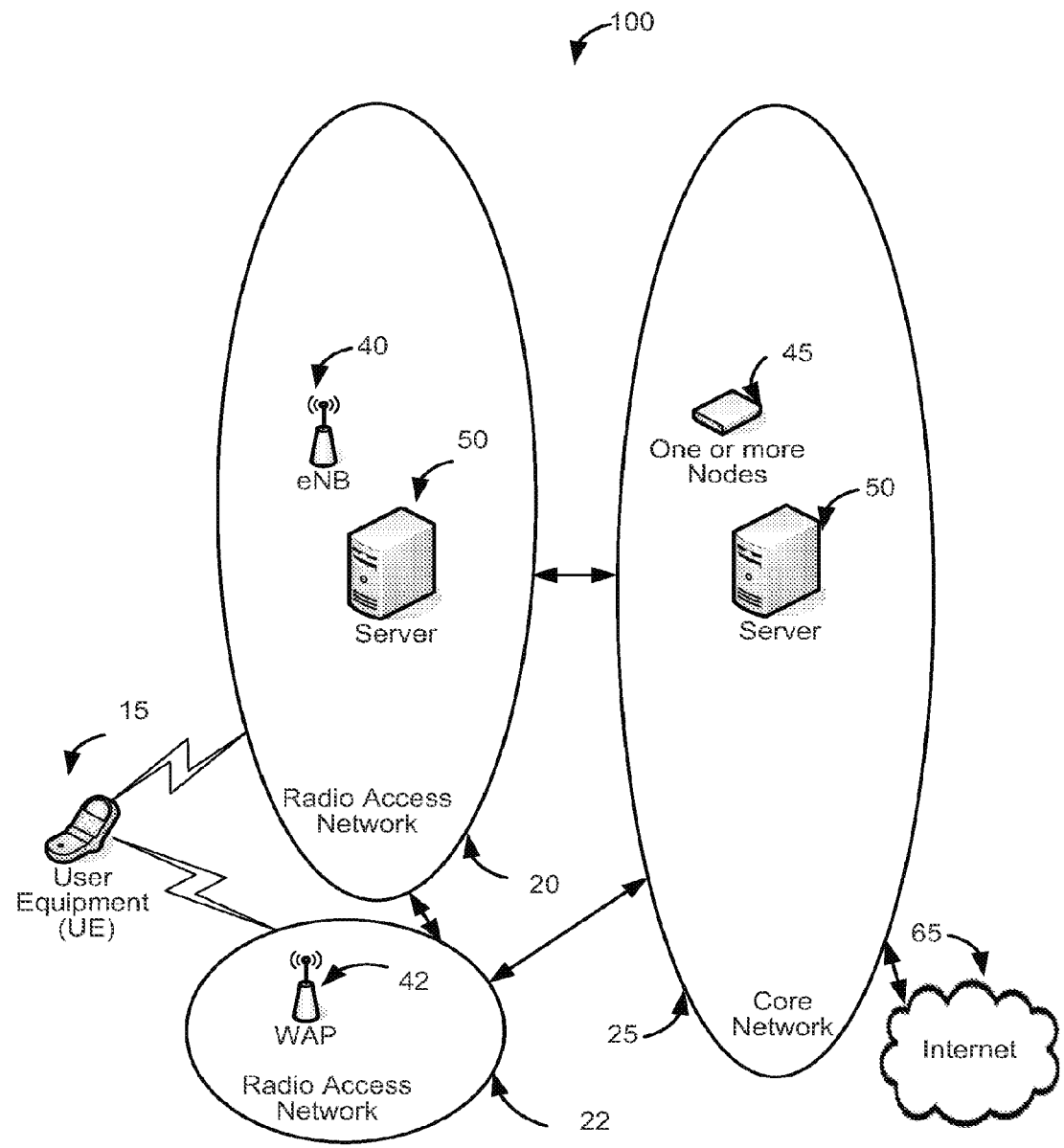
FIG. 1 illustrates an example wireless communication network in accordance with some embodiments.

Embodiments of the present disclosure provide data techniques and configurations in a wireless communication network including techniques and configurations for managing resources, such as multiple radio access networks (RAN), configured to facilitate content delivery to a wireless device operating in these radio access networks. In some embodiments, the techniques described herein provide for aggregating resources from at least two radio access networks, such as, for example a wireless local area network (WLAN), such as Wi-Fi, and a cellular network (e.g., wireless wide area network (WWAN)) based in part on the quality of user experience (QoE) measurements associated with content delivery to the wireless device via the radio access networks.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic," "module," or "circuitry" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In some embodiments, the term "logic," "module," or "circuitry" may refer to a combination of software and hardware components.

Example embodiments may be described herein in relation to wireless communication networks including networks such as $3^{rd}$ Generation Partnership Project (3GPP) Long-Term Evolution (LTE) networks including any amendments, updates, and/or revisions (e.g., LTE Release 10 (also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to WLANs, such as Wi-Fi, wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, eNBs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

FIG. 1 schematically illustrates an example wireless network 100 in accordance with some embodiments. The network 100 may include one or more radio access networks (RAN) 20 and 22, and a core network 25. In some embodiments, the network 100 may be an LTE network, the RAN 20 may be a cellular network, such as E-UTRAN, and alternatively be referred to as 3GPP access network 20; the RAN 22 may be a wireless local area network (WLAN) and alternatively be referred to as WLAN 22, such as Wi-Fi or other peer-to-peer (P2P) network, and the core network 25 may be an evolved core network such as EPS (Evolved Packet System). A client wireless device (hereinafter "User Equipment" (UE)) 15 may access the core network 25 via a radio link ("link") with an eNB 40 in the RAN 20 and/or via a wireless access point (WAP) 42 of the RAN 22 (e.g., Wi-Fi). In some embodiments, communications over the radio access networks 20 and 22, such content delivery to the UE 15 may occur substantially simultaneously. For simplicity purposes, eNB 40 and WAP 42 will be called "base stations" hereinafter.

The UE 15 may be, for example, a subscriber station (e.g., a mobile wireless device) that is configured to communicate with the eNB 40 (wireless access points 42), in conformance with one or more protocols. One or more antennas of the UE 15 may be used to concurrently utilize radio resources of multiple respective component carriers (e.g., which may correspond with antennas of eNB 40 or WAP 42) of RAN 20. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a mobile device (e.g., a cellular phone), in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. In an embodiment, the UE 15 may be a Machine Type Communication (MTC) device, also known as machine-to-machine device. In the present disclosure, the terms "UE," "client," and "(mobile) wireless device" will be used interchangeably for simplicity purposes.

In some embodiments, communication with the UE 15 via RAN 20 may be facilitated via one or more nodes 45 (e.g., Radio Network Controllers). The one or more nodes 45 may act as an interface between the core network 25 and the RAN 20 (22). According to various embodiments, the one or more nodes 45 may include a Mobile Management Entity (MME) that is configured to manage signaling exchanges (e.g., authentication of the UE 15 and NAS (non-access stratum) messages) between the base stations 40, 42 and the core network 25 (e.g., one or more network servers 50), a Packet Data Network Gateway (PGW) to provide a gateway router to the Internet 65, and/or a Serving Gateway (SGW) to manage user data tunnels or connections between the base stations 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the network 100. For example, the core network 25 may include a network entity, such as a network server (e.g., one or more servers) 50 that may be communicatively coupled to the base stations 40, 42. In an embodiment, the network server 50 may include a Home Subscriber Server (HSS), which may be used to manage user parameters such as a user's International Mobile Subscriber Identity (IMSI), authentication information, and the like. The core network 25 may include other servers, interfaces, and modules. In some embodiments, logic associated with different functionalities of the network server (or one or more network servers) 50 may be combined to reduce a number of servers, including, for example, being combined in a single machine or module. In some embodiments, the network server 50 may be deployed inside the core network 25 or inside RAN 20 or 22 (as shown in FIG. 1). In general, eNB 40, WAP 42, and server 50 may physically be co-located in the same piece of hardware/machine, e.g., one or more computing devices.

According to various embodiments, the network 100 may be an Internet Protocol (IP) based network. For example, the core network 25 may be, at least in part, an IP based network, such as a packet switched (PS) network. Interfaces between network nodes (e.g., the one or more nodes 45) may be based on IP, including a backhaul connection to the base stations 40, 42. In some embodiments, the network may be enabled to provide connection with a circuit switched (CS) network (e.g., CS domain). In an embodiment, a UE may communicate with the network according to one or more communication protocols, such as, for example, Radio Resource Control (RRC) protocol adapted for LTE communication environment.

In some embodiments, the resource management of communications between the UE 15 and the core network 25 over multiple radio access networks 20 and 22 may be based on quality of experience information provided to the UE 15. The described techniques enable allocating data traffic (e.g., content delivery) between different radio access networks, such as 3GPP access network and WLAN so as to efficiently use bandwidth provided by the radio access networks 20 and 22 while minimizing cost of content delivery. For example, the cost of content delivery over WLAN 22 such as Wi-Fi may be lower than the cost of content delivery over a cellular network. Accordingly, allocating data traffic to maximize the use of Wi-Fi network, when possible, may result in cost savings associated with content delivery. In another example, increasing end-to-end (E2E) throughput through the cellular network may ensure that sufficient volume of content may be buffered by the wireless device (e.g., UE 15) for user access so as to provide seamless quality of user experience, such as by providing a non-interrupted content delivery to the user.

Figure 2:
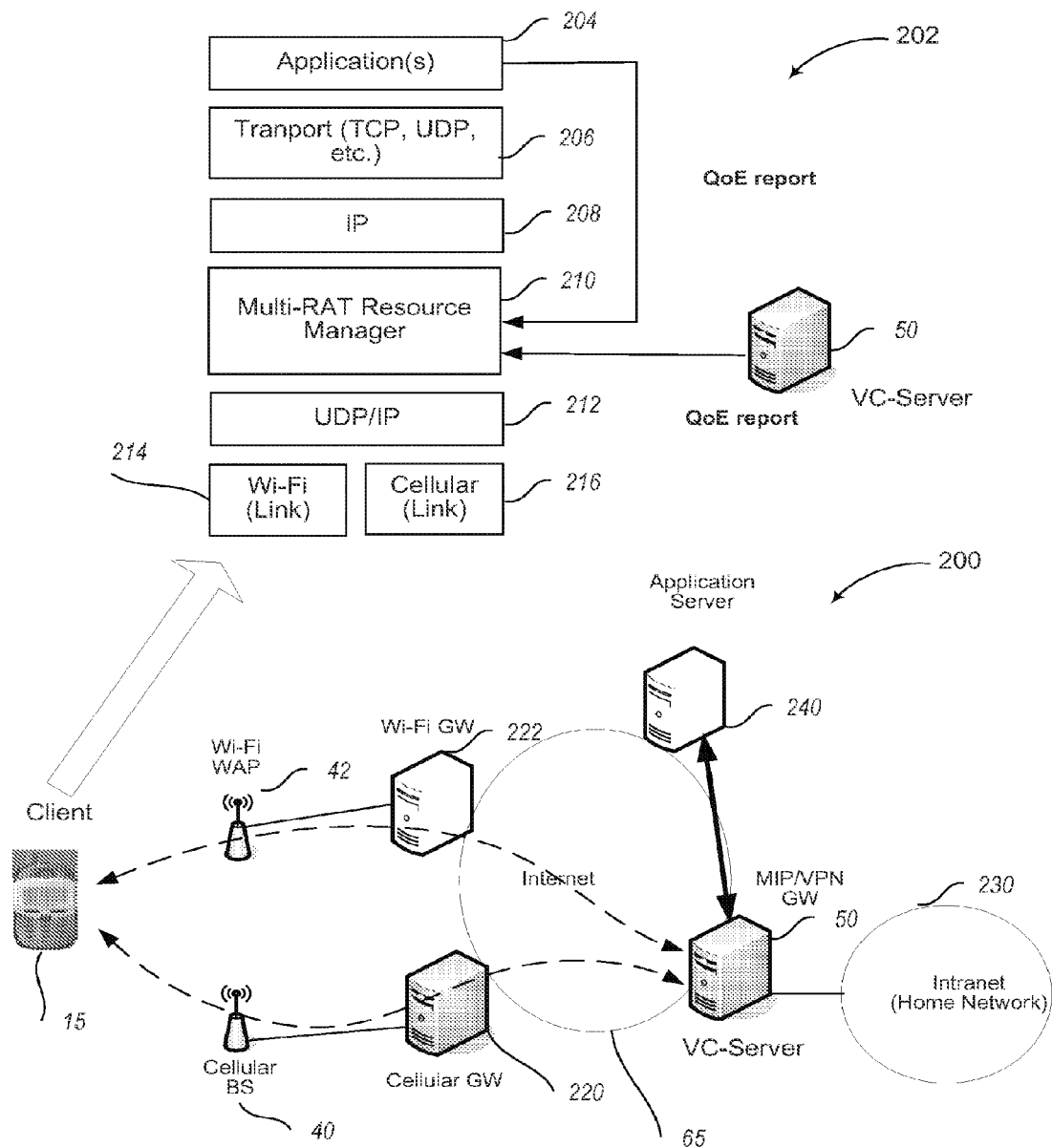
FIG. 2 is a block diagram illustrating a wireless communication system operating on at least two radio access networks and schematic depictions of protocols used in such communication, in accordance with some embodiments.

FIG. 2 illustrates a virtual connection (VC) network architecture 200 based on the wireless network 100 described in reference to FIG. 1. The network architecture 200 may include UE 15, connected to server 50 via two radio access networks (e.g., cellular such as LTE, and Wi-Fi) through the Wi-Fi WAP 42 and Wi-Fi gateway (GW) server 222, and cellular base station 40 and cellular network GW server 220. A virtual connection (VC) server 50 may be configured to facilitate a connection between the UE 15 and a data network (e.g., Internet) 65 and, in some embodiments, a home network (e.g., Intranet) 230, via, for example, Mobile Internet Protocol (Mobile IP) or Virtual Private Network (VPN) protocol gateway technology. In some embodiments, the UE 15 may be connected with two RANs and may communicate over the two RANs substantially simultaneously. The network architecture 200 may further include an application server 240 configured to provide applications executable on the UE 15, such as, for example, video, audio, or other content streaming applications.

FIG. 2 further illustrates an example Wi-Fi/Cellular integration protocol stack 202 associated with (e.g., implemented by circuitry operating on) the UE 15. The integration protocol stack 202 may include, but is not limited to, an application layer 204 (e.g., applications executing on the UE 15), a transport layer 206 (e.g., Transmission Control Protocol (TCP), User Datagram Protocol (UDP), or the like), IP layer 208, UDP/IP layer 212, and Wi-Fi and cellular link layers 214 and 216. In other embodiments, a protocol stack may have additional/alternative layers.

The integration protocol stack 202 may further include a virtual connection layer, that may be responsible for measuring downlink network performance, e.g. packet loss rate, throughput, delay, etc. The virtual connection layer may include, in some embodiments, multi-radio technology (multi-RAT) resource manager 210, configured to determine how to split data traffic over multiple networks (e.g., cellular and Wi-Fi) for bandwidth (BW) aggregation.

In some embodiments, the multi-RAT resource manager 210 may be configured to obtain a client interface quality of user experience (QoE) information report from the application layer 204 in order to make an informed decision regarding BW aggregation (e.g., adjusting delivery of data traffic such as content between the radio access networks) based on network performance measurements as well as QoE information in the QoE information report. In some embodiments, the QoE information may include a subjective measure of user experience with a particular service, e.g., providing user access to content through an application executing on a client device such as UE 15. In some embodiments, the QoE information report may be obtained from the server 50, as shown in FIG. 2. For example, the server 50 may perform deep packet inspection in order to obtain the network performance measurements and QoE information and provide it to the multi-RAT resource manager 210.

For example, if the application layer 204 includes an application configured to provide a streaming of content to the UE 15 (e.g., a video or audio streaming application), the QoE information may include a Playback Buffer (PB) value, for example, a period of time (e.g., number of seconds) that the application may be able to provide content for user access (e.g., play a video file) with all the packets that have been received so far; and a Player State (PS) value, for example, an integer to indicate the current state of the application (e.g., unstarted, ended, content being provided for user access (e.g., playing), paused, buffered, queued, and the like).

For example, if the streaming application includes YouTube®, the multi-RAT resource manager 210 may be configured to obtain from the application layer 204 the following YouTube® JavaScript player application program interface (API) functions, in order to determine QoE information (as an example, PB and PS values):

getVideoLoadedFraction( ): a number between 0 and 1 that specifies the percentage of the content (e.g., video) that the application (player) shows as buffered;

getPlayerState( ): the state of the player. The following values may indicate the corresponding states: unstarted (−1), ended (0), playing (1), paused (2), buffering (3), video cued (5);

getCurrentTime( ): the elapsed time in seconds since the video started playing; and getDuration( ): the duration in seconds of the currently playing video.

The PB and PS values may be determined as follows:

PB=getVideoLoadedFraction( )×getDuration( )−getCurrentTime( );

PS=getPlayerState( ).

In order to facilitate BW aggregation decision-making by the multi-RAT resource manager 210, a playback buffer threshold (PBT) may be defined as a targeted playback buffer, e.g., a targeted period of time the application may be able to provide content that is buffered for user access (e.g., play a video file).

The multi-RAT resource manager 210 may use the following technique to make the BW aggregation (content delivery adjustment) decision: If (PB<PBT) {increase end-to-end (E2E) throughput of the cellular network} else {increase WLAN (e.g., Wi-Fi) offload ratio}. The WLAN (Wi-Fi) offload ratio may indicate a proportion of data traffic (e.g., content) that may be delivered over a WLAN (e.g., Wi-Fi) network. For example, if the WLAN offload ratio is 20%, then 2 packets of every 10 data packets may be delivered over WLAN, and the rest 8 packets may be delivered over a cellular network. E2E throughput adjustment or Wi-Fi offload ratio adjustment may be accomplished via a variety of load balancing and BW aggregation techniques that are not the subject of the current disclosure. For example, the Multi-RAT resource manager on the client may measure the downlink QoS parameters, e.g. packet loss rate, delay variation, throughput, of WLAN (e.g., Wi-Fi) and cellular network based on the received packets to determine which network is overloaded, and then increase the load on the other network, e.g., by adjusting the WLAN offload ratio accordingly. The objective is to fully utilize both WLAN (e.g., Wi-Fi) and cellular networks and get the increased (e.g., up to a maximum) throughput.

Accordingly, E2E throughput may be adjusted (e.g., increased) if the playback buffer PB is below the threshold PBT. For example, the multi-RAT resource manager 210 may adjust the WLAN (e.g., Wi-Fi) offload ratio such that both networks may be fully utilized. If the playback buffer is higher than the threshold, the application performance may be considered to be at a desired level, and the multi-radio technology resource manager 210 may increase the WLAN offload ratio by x % or to 100% to reduce the cellular usage. In general, the multi-RAT resource manager 210 may utilize the WLAN offload ratio as a main control parameter for content delivery adjustment. As described above, the WLAN offload ratio defines how much traffic is sent over Wi-Fi. When the multi-RAT resource manager 210 determines to increase WLAN offload, the WLAN offload ratio may be set to 100% or increased by x % for each control cycle.

The multi-RAT resource manager 210 may adjust PBT as follows when PS indicates "buffering": PBT=PBT0+PB, where PBT0 may be an initial value, which may be preconfigured to a fixed value (e.g., about 20 seconds). Accordingly, PBT may be a dynamically determined threshold value.

If PS is not any of the following states: buffering, playing, or pausing, the multi-RAT resource manager 210 may reset PBT to the initial value PBT0. PB may be updated periodically, while PBT may only be updated in the event of buffering. For example, when buffering occurs at t0, PB=10 time units (e.g., seconds) and PBT0=20 time units, then PBT=30 time units. Thus, PBT may be set to 30 time units until the next buffering event. A new PB may be determined in each control cycle, e.g., upon receipt of the QoE information from the application layer 402.

Figure 3:
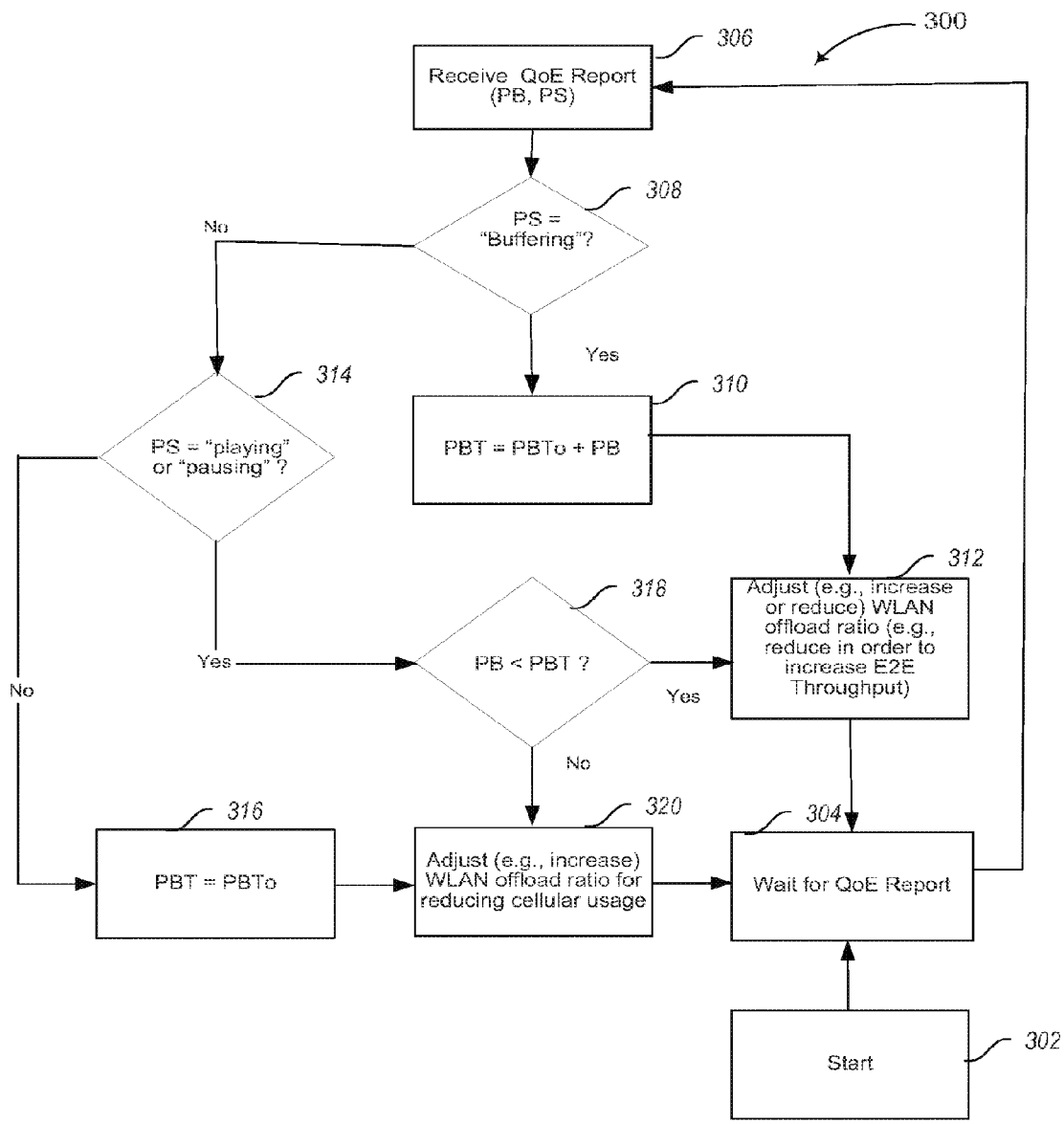
FIG. 3 is an example process flow diagram illustrating content delivery adjustment for at least one of two radio access networks in accordance with some embodiments.

FIG. 3 is an example process flow diagram 300 illustrating multi-radio technology resource management by content delivery adjustment for at least one of two radio access networks in accordance with some embodiments. In some embodiments, the two radio access networks may include a WLAN (e.g., Wi-Fi) and a cellular network (e.g., LTE).

The process 300 may begin at block 302, where a multi-radio technology resource manager 210 may become operational. At block 304, the multi-radio technology resource manager 210 may wait for a QoE information report from an application (e.g., a streaming application) of the application layer 204 of the protocol stack 202 described in reference to FIG. 2. As described above, in some embodiments, the application layer 204 may include a video player, YouTube®, or other video or audio streaming application. At block 306, the multi-RAT resource manager 210 may receive the QoE report from the application layer 204.

At decision block 308, the multi-RAT resource manager 210 may initiate a determination, based on the QoE information provided in the received report, of a current state of the application. More specifically, the multi-RAT resource manager 210 may determine whether PS value provided in the QoE information indicates that the application is in a buffering state, e.g., whether the content delivered via the application is being buffered, e.g., in a local memory of the client 15.

If the multi-RAT resource manager 210 determines at decision block 308 that the application is in the buffering state, at block 312 the multi-RAT resource manager 210 may adjust a volume of content provided via a WLAN (e.g., Wi-Fi). In some embodiments, the multi-radio technology resource manager 210 may reduce WLAN offload ratio in order to increase the total throughput. The process 300 may then revert to block 304, where the multi-RAT resource manager 210 may wait for a next QoE information report.

If at decision block 308 the multi-RAT resource manager 210 determines that the application is not in the buffering state, the multi-RAT resource manager 210 may determine, at decision block 314, whether the application is in a playing or pausing state, based on the PS value provided in the QoE information. If the multi-radio technology resource manager 210 determines that the application is in either of these states, the multi-RAT resource manager 210 may determine, at decision block 318, whether the value of playback buffer PB is less than playback buffer threshold PBT.

If the multi-RAT resource manager 210 determines at decision block 318 that the value of playback buffer PB is less than playback buffer threshold PBT, the multi-RAT resource manager 210 at block 312 may adjust (e.g. increase or reduce) the WLAN offload ratio in order to fully utilize both Wi-Fi and cellular, and increase the total throughput. In some embodiments, the decision of whether the WLAN offload ration may be increased or reduced may depend, for example, on which network is more overloaded. If WLAN is more overloaded, the WLAN offload ratio may be reduced; if the cellular network is more overloaded, the WLAN offload ratio may be increased. In some embodiments, the multi-RAT resource manager 210 may reduce WLAN off-load ratio in order to increase E2E throughput through the cellular network.

If the multi-RAT resource manager 210 determines at decision block 318 that the value of playback buffer PB is equal or greater than the PBT, the multi-RAT resource manager 210 at block 320 may increase WLAN offload ratio in order to reduce cellular usage. The process 300 may then revert to block 304, where the multi-RAT resource manager 210 may wait for the next QoE information report.

If at decision block 314 the multi-RAT resource manager 210 determines that the application 204 is not in a playing or pausing state, at block 316 the multi-RAT resource manager 210 may reset PBT to its initial value PBT0 as described above. The multi-RAT resource manager 210 may then adjust (e.g., increase) WLAN offload ratio at block 320. The process 300 may then revert to block 304, where the multi-RAT resource manager 210 may wait for the next QoE information report.

Figure 4:
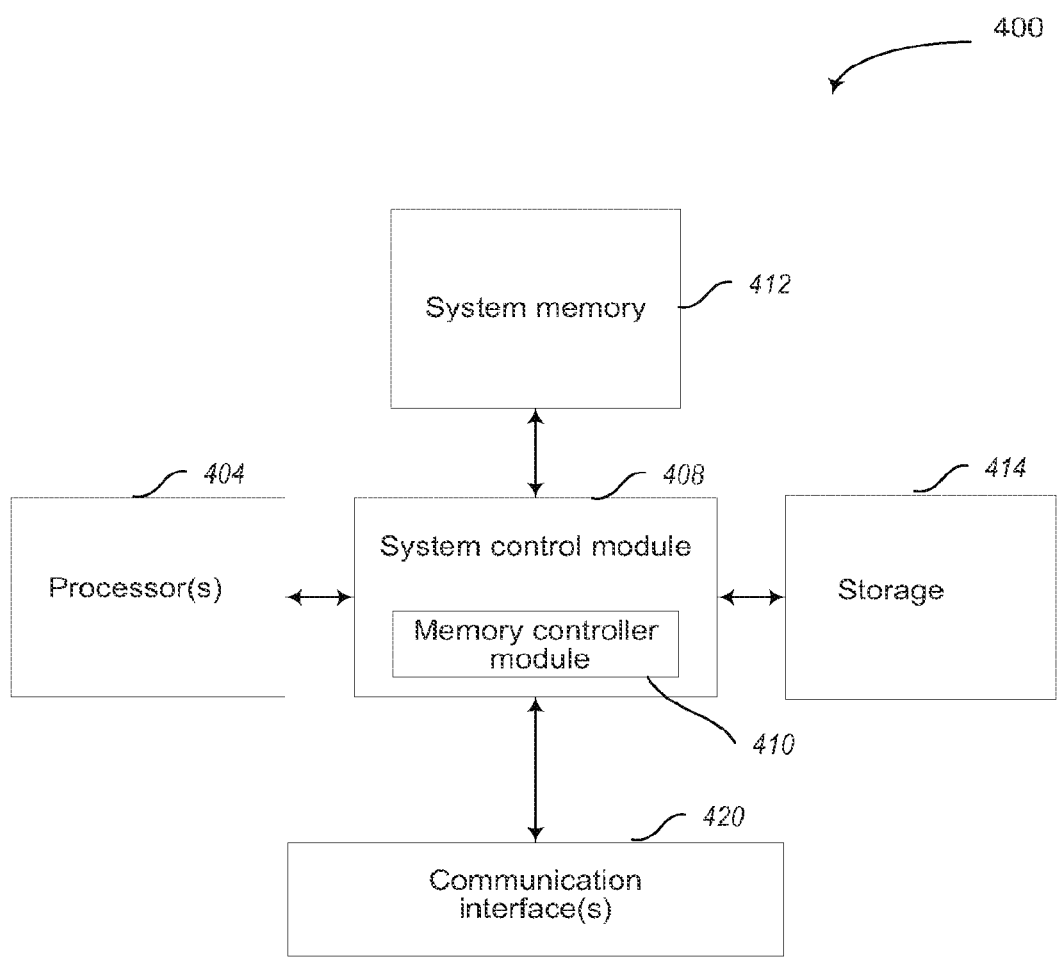
FIG. 4 illustrates an example system that may be used to practice various embodiments described herein.

Embodiments of the present disclosure may be implemented into a system using any suitable hardware and/or software to configure as desired. FIG. 4 schematically illustrates an example system that may be used to practice various embodiments described herein. FIG. 4 illustrates, for one embodiment, an example system 400 having one or more processor(s) 404, system control module 408 coupled to at least one of the processor(s) 404, system memory 412 coupled to system control module 408, non-volatile memory (NVM)/storage 414 coupled to system control module 408, and one or more communications interface(s) 420 coupled to system control module 408.

In some embodiments, the system 400 may be capable of functioning as the UE 15 as described herein. In other embodiments, the system 400 may be capable of functioning as the one or more nodes 45 or network server 50 of FIG. 1, or otherwise provide logic/module that performs functions as described for eNB 40, 42 and/or other modules described herein. In some embodiments, the system 400 may include one or more computer-readable media (e.g., system memory or NVM/storage 414) having instructions and one or more processors (e.g., processor(s) 404) coupled with the one or more computer-readable media and configured to execute the instructions to implement a module to perform actions described herein.

System control module 408 for one embodiment may include any suitable interface controllers to provide for any suitable interface to at least one of the processor(s) 404 and/or to any suitable device or component in communication with system control module 408.

System control module 408 may include memory controller module 410 to provide an interface to system memory 412. The memory controller module 410 may be a hardware module, a software module, and/or a firmware module.

System memory 412 may be used to load and store data and/or instructions, for example, for system 400. System memory 412 for one embodiment may include any suitable volatile memory, such as suitable DRAM, for example. In some embodiments, the system memory 412 may include double data rate type four synchronous dynamic random-access memory (DDR4 SDRAM).

System control module 408 for one embodiment may include one or more input/output (I/O) controller(s) to provide an interface to NVM/storage 414 and communications interface(s) 420.

The NVM/storage 414 may be used to store data and/or instructions, for example. NVM/storage 414 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 414 may include a storage resource physically part of a device on which the system 400 is installed or it may be accessible by, but not necessarily a part of, the device. For example, the NVM/storage 414 may be accessed over a network via the communications interface(s) 420.

Communications interface(s) 420 may provide an interface for system 400 to communicate over one or more network(s) and/or with any other suitable device. The system 400 may wirelessly communicate with the one or more components of the wireless network in accordance with any of one or more wireless network standards and/or protocols.

For one embodiment, at least one of the processor(s) 404 may be packaged together with logic for one or more controller(s) of system control module 408, e.g., memory controller module 410. For one embodiment, at least one of the processor(s) 404 may be packaged together with logic for one or more controllers of system control module 408 to form a System in Package (SiP). For one embodiment, at least one of the processor(s) 404 may be integrated on the same die with logic for one or more controller(s) of system control module 408. For one embodiment, at least one of the processor(s) 404 may be integrated on the same die with logic for one or more controller(s) of system control module 408 to form a System on Chip (SoC).

In various embodiments, the system 400 may be, but is not limited to, a server, a workstation, a desktop computing device, or a mobile computing device (e.g., a laptop computing device, a handheld computing device, a tablet, a netbook, etc.). In various embodiments, the system 900 may have more or less components, and/or different architectures. For example, in some embodiments, the system 900 may include one or more of a camera, a keyboard, liquid crystal display (LCD) screen (including touch screen displays), non-volatile memory port, multiple antennas, graphics chip, application-specific integrated circuit (ASIC), and speakers.

The embodiments described herein may be further illustrated by the following examples. Example 1 is a multi-radio technology resource manager for managing resources in multiple radio access networks, comprising: logic to obtain, from an application layer of a computing device associated with the resource manager or a network server that is capable of deep packet inspection, quality of experience (QoE) information associated with a provision of content being delivered to the computing device for user access, wherein the content is delivered via at least two radio access networks; and logic to initiate adjustment of the content delivery via at least one of the two radio access networks, based at least in part on the QoE information.

Example 2 may include the subject matter of Example 1, and further specifies that the QoE information may include: a value indicating a status of the content provision for user access, the status including: unstarted, ended, being provided, paused, buffered, or queued; a value indicating a portion of content that is buffered by the computing device; a value indicating a time period elapsed since the content provision started; or a value indicating a duration of the content provision for user access.

Example 3 may include the subject matter of Example 2, and further specifies that the multi-radio technology resource manager may further comprise: logic to generate a target buffer threshold associated with the content based on the QoE information, the target buffer threshold indicating a target time period during which the buffered portion of the content is to be provided for user access; and logic to determine whether to increase end-to-end (E2E) content delivery throughput via the two radio access networks or to increase a volume of content delivery via one of the two radio access networks, based at least in part on the generated target buffer threshold and the status of the content provision for user access.

Example 4 may include the subject matter of Example 3, and further specifies that the one of the two radio access networks may include a cellular network, and the other one of the two radio access networks may include a local area network.

Example 5 may include the subject matter of Example 4, and further specifies that the local area network includes Wi-Fi, and the cellular network includes a wireless wide area network (WWAN).

Example 6 may include the subject matter of Example 3, and further specifies that the multi-radio technology resource manager may further comprise logic to calculate the target buffer threshold based on the value indicating a portion of content that is buffered by the computing device, the value indicating a time period elapsed since the content provision started; and the value indicating a duration of the content provision for user access.

Example 7 may include the subject matter of Example 3, and further specifies that the multi-radio technology resource manager may further comprise logic to reset the buffer threshold to a determined value, based at least in part on the status of the content provision for user access.

Example 8 may include the subject matter of any of Examples 1 to 7, and further specifies that the computing device includes a wireless device.

Example 9 may include the subject matter of Example 8, and further specifies that the wireless device includes at least one of a smartphone, a tablet computer, an ultrabook, a desktop, or a laptop.

Example 10 is a computer-implemented method for managing resources in multiple radio access networks, comprising: obtaining, by a computing device, quality of experience (QoE) information from a network server running deep packet inspection or an application executing on the computing device and configured to provide content to the computing device for user access, wherein the content is delivered to the computing device via at least two radio access networks; and determining, with the computing device, whether to adjust the content delivery via at least one of the two radio access networks, based at least in part on the quality experience information, the adjustment including increasing the content delivery via one of the radio access networks.

Example 11 may include the subject matter of Example 10, and further specifies that the adjusting the content delivery via at least one of the two radio access networks includes: generating, with the computing device, a target buffer threshold associated with the content based on the QoE information, the target buffer threshold indicating a target time period during which a buffered portion of the content is to be provided for user access; and determining, with the computing device, whether to increase end-to-end (E2E) content delivery throughput via the two radio access networks or to increase a volume of content delivery via one of the two radio access networks, based at least in part on a result of the generating.

Example 12 may include the subject matter of Example 11, and further specifies that the determining may be further based on a status of the application.

Example 13 may include the subject matter of Example 12, and further specifies that the status of the application is included in the QoE, the status including: unstarted, ended, being provided, paused, buffered, or queued; a value indicating a portion of content that is buffered by the computing device; a value indicating a time period elapsed since the content provision started; or a value indicating a duration of the content provision for user access.

Example 14 may include the subject matter of any of Examples 10 to 13, and further specifies that the application includes a content streaming application.

Example 15 is at least one computing device-readable storage medium having executable instructions for managing resources in multiple radio access networks stored thereon that, in response to execution by a computing device, cause the computing device to: obtain, from a network server running deep packet inspection or an application executing on the computing device, quality of experience (QoE) information associated with provision of content by the application to the computing device for user access, wherein the content is delivered for provision substantially simultaneously via at least two radio access networks; and increase a volume of the content delivery via at least one of the two radio access networks, based at least in part on the quality experience information.

Example 16 may include the subject matter of Example 15, and further specifies that the executable instructions further cause the computing device to generate a target buffer threshold associated with the content based on the QoE information, the target buffer threshold indicating a target time period during which a buffered portion of the content is to be provided for user access; and determine whether to increase end-to-end (E2E) content delivery throughput via the two radio access networks or to increase a volume of content delivery via one of the two radio access networks, based at least in part on the target buffer threshold.

Example 17 may include the subject matter of Example 16, and further specifies that the executable instructions further cause the computing device to buffer the portion of the content on the computing device.

Example 18 may include the subject matter of Example 15, and further specifies that the one of the two radio access networks includes a cellular network, and wherein the one of the two radio access networks includes a local area network.

Example 19 may include the subject matter of Example 18, and further specifies that the local area network includes Wi-Fi, and the cellular network includes a wireless wide area network (WWAN).

Example 20 may include the subject matter of Example 15, and further specifies that the application includes a video, audio, or other content streaming application.

Example 21 may include the subject matter of Example 15, and further specifies that the QoE information may be obtained from a network server or an application programming interface (API) associated with the application.

Example 22 may include the subject matter of any of Examples 15 to 21, and further specifies that the computing device-readable storage medium is included in an apparatus, the apparatus including one or more processors coupled with the one or more computing device-readable medium and configured to execute the instructions stored on the computing device-readable medium.

Example 23 is an apparatus for managing resources in multiple radio access networks, comprising: means for obtaining, from an application layer of a computing device associated with the resource manager or a network server that is capable of deep packet inspection, quality of experience (QoE) information associated with a provision of content being delivered to the computing device for user access, wherein the content is delivered via at least two radio access networks; and means for initiating adjustment of the content delivery via at least one of the two radio access networks, based at least in part on the QoE information.

Example 24 may include the subject matter of Example 23, and further specifies that the apparatus may further comprise means for generating a target buffer threshold associated with the content based on the QoE information, the target buffer threshold indicating a target time period during which a portion of the content that is buffered is to be provided for user access; and means for determining whether to increase end-to-end (E2E) content delivery throughput via the two radio access networks or to increase a volume of content delivery via one of the two radio access networks, based at least in part on the generated target buffer threshold and the status of the content provision for user access.

Example 25 may include the subject matter of any of Examples 23 to 24, and further specifies that the one of the two radio access networks includes a cellular network, and wherein the other one of the two radio access networks includes a local area network.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A computing device, comprising:
a processor; and
a multi-radio technology resource manager for managing resources in multiple radio access networks executable on the processor, wherein the resource manager includes:
logic to obtain, from an application layer of the computing device associated with the resource manager or a network server that is capable of deep packet inspection, quality of experience (QoE) information associated with a provision of content being delivered to the computing device for user access, wherein the QoE information includes: a value indicating a status of the content provision for user access, the status including: unstarted, ended, being provided, paused, buffered, or queued; a value indicating a portion of content that is buffered by the computing device; a value indicating a time period elapsed since the content provision started; or a value indicating a duration of the content provision for user access wherein the content is delivered via at least two radio access networks;
logic to initiate adjustment of the content delivery via at least one of the two radio access networks, based at least in part on the QoE information;
logic to generate a target buffer threshold associated with the content based on the QoE information, the target buffer threshold indicating a target time period during which the buffered portion of the content is to be provided for user access; and
logic to determine whether to increase end-to-end (E2E) content delivery throughput via the two radio access networks or to increase a volume of content delivery via one of the two radio access networks, based at least in part on the generated target buffer threshold and the status of the content provision for user access.

2. The computing device of claim 1, wherein the one of the two radio access networks includes a cellular network, and wherein the other one of the two radio access networks includes a local area network.

3. The computing device of claim 2, wherein the local area network includes Wi-Fi, and the cellular network includes a wireless wide area network (WWAN).

4. The computing device of claim 1, wherein the multi-radio technology resource manager further comprises:
logic to calculate the target buffer threshold based on the value indicating a portion of content that is buffered by the computing device, the value indicating a time period elapsed since the content provision started; and the value indicating a duration of the content provision for user access.

5. The computing device of claim 1, wherein the multi-radio technology resource manager further comprises:
logic to reset the buffer threshold to a determined value, based at least in part on the status of the content provision for user access.

6. The computing device of claim 1, wherein the computing device includes a wireless device.

7. The computing device of claim 6, wherein the wireless device includes at least one of a smartphone, a tablet computer, an ultrabook, a desktop, or a laptop.

8. A computer-implemented method for managing resources in multiple radio access networks, comprising:
obtaining, by a computing device, quality of experience (QoE) information from a network server running deep packet inspection or an application executing on the computing device and configured to provide content to the computing device for user access, wherein the content is delivered to the computing device via at least two radio access networks;
determining, by the computing device, whether to adjust the content delivery via at least one of the two radio access networks, based at least in part on the quality experience information, the adjustment including increasing the content delivery via one of the radio access networks;
generating, by the computing device, a target buffer threshold associated with the content based on the QoE information, the target buffer threshold indicating a target time period during which a buffered portion of the content is to be provided for user access; and
determining, by the computing device, whether to increase end-to-end (E2E) content delivery throughput via the two radio access networks or to increase a volume of content delivery via one of the two radio access networks, based at least in part on a result of the generating.

9. The computer-implemented method of claim 8, wherein the determining is further based on a status of the application.

10. The computer-implemented method of claim 9, wherein the status of the application is included in the QoE, the status including: unstarted, ended, being provided, paused, buffered, or queued; a value indicating a portion of content that is buffered by the computing device; a value indicating a time period elapsed since the content provision started; or a value indicating a duration of the content provision for user access.

11. The computer-implemented method of claim 8, wherein the application includes a content streaming application.

12. At least one non-transitory computing device-readable storage medium having executable instructions for managing resources in multiple radio access networks stored thereon that, in response to execution by a computing device, cause the computing device to:
obtain, from a network server running deep packet inspection or an application executing on the computing device, quality of experience (QoE) information associated with provision of content by the application to the computing device for user access, wherein the content is delivered for provision via at least two radio access networks;
increase a volume of the content delivery via at least one of the two radio access networks, based at least in part on the quality experience information;
generate a target buffer threshold associated with the content based on the QoE information, the target buffer threshold indicating a target time period during which a buffered portion of the content is to be provided for user access; and
determine whether to increase end-to-end (E2E) content delivery throughput via the two radio access networks or to increase a volume of content delivery via one of the two radio access networks, based at least in part on the target buffer threshold.

13. The at least one non-transitory computing device-readable storage medium of claim 12, wherein the executable instructions further cause the computing device to buffer the portion of the content on the computing device.

14. The at least one non-transitory computing device-readable storage medium of claim 12, wherein the one of the two radio access networks includes a cellular network, and wherein the one of the two radio access networks includes a local area network.

15. The at least one non-transitory computing device-readable storage medium of claim 14, wherein the local area network includes Wi-Fi, and the cellular network includes a wireless wide area network (WWAN).

16. The at least one non-transitory computing device-readable storage medium of claim 12, wherein the application includes a video, audio, or other content streaming application.

17. The at least one non-transitory computing device-readable storage medium of claim 12, wherein the QoE information is obtained from a network server or an application programming interface (API) associated with the application.

18. The at least one non-transitory computing device-readable storage medium of claim 12, wherein the computing device-readable storage medium is included in an apparatus, the apparatus including one or more processors coupled with the one or more computing device-readable medium and configured to execute the instructions stored on the computing device-readable medium.

* * * * *